C. F. WALL & F. HARKER.
MACHINE FOR CUTTING TORIC LENS GRINDERS.
APPLICATION FILED AUG. 22, 1907.
1,033,640.
Patented July 23, 1912.
4 SHEETS—SHEET 2.
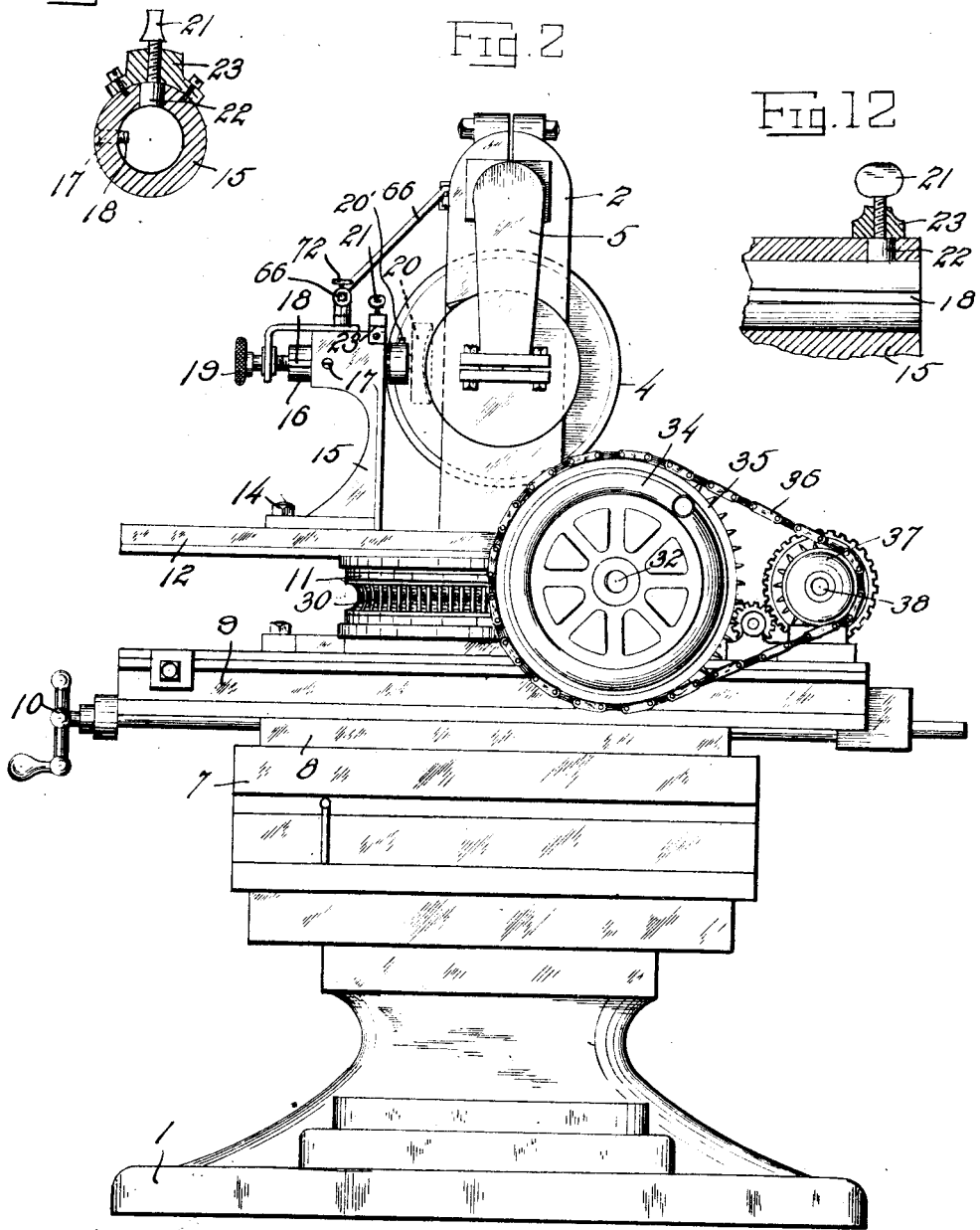

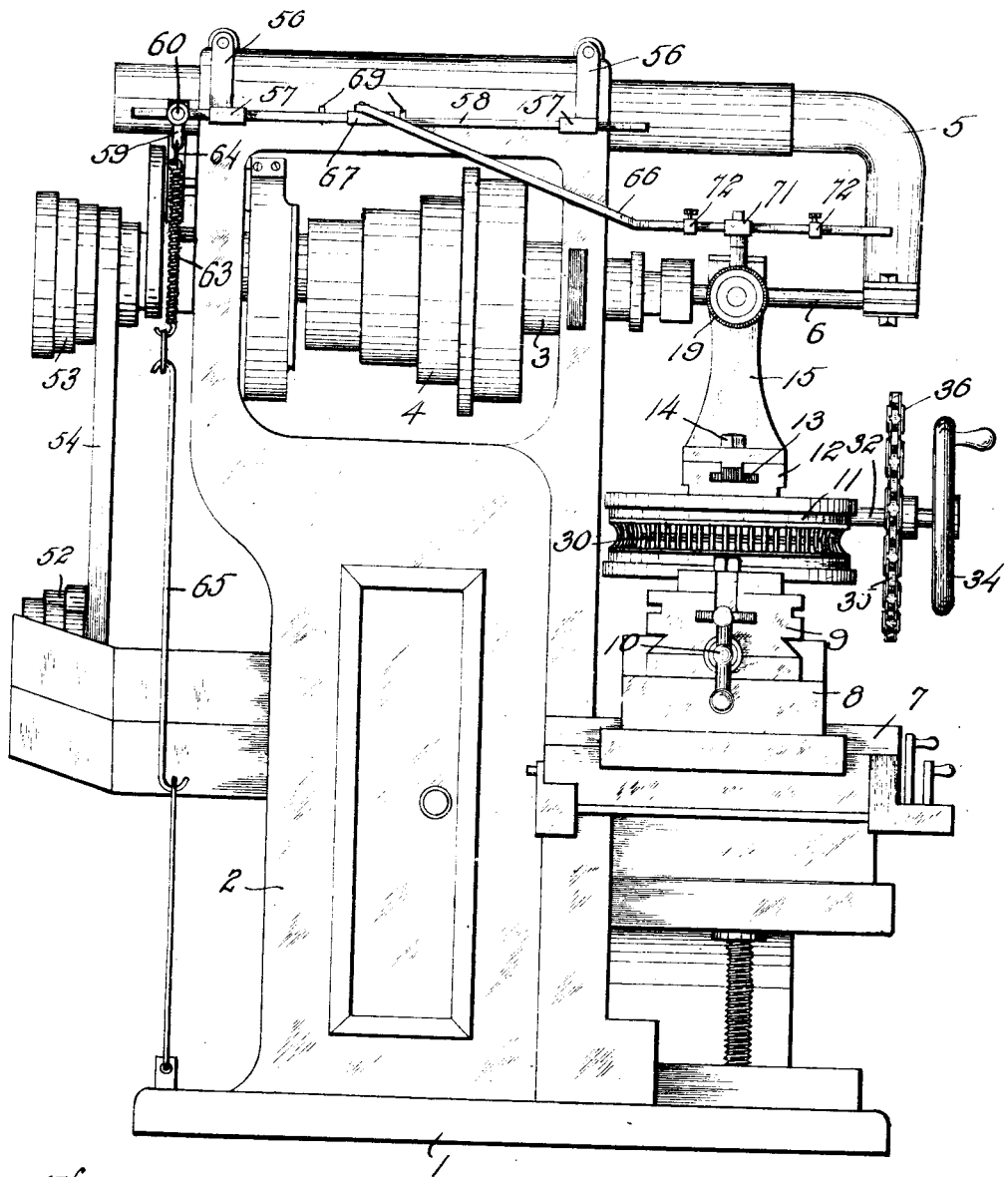

C. F. WALL & F. HARKER.
MACHINE FOR CUTTING TORIC LENS GRINDERS.
APPLICATION FILED AUG. 22, 1907.
1,033,640.
Patented July 23, 1912.
4 SHEETS—SHEET 3.
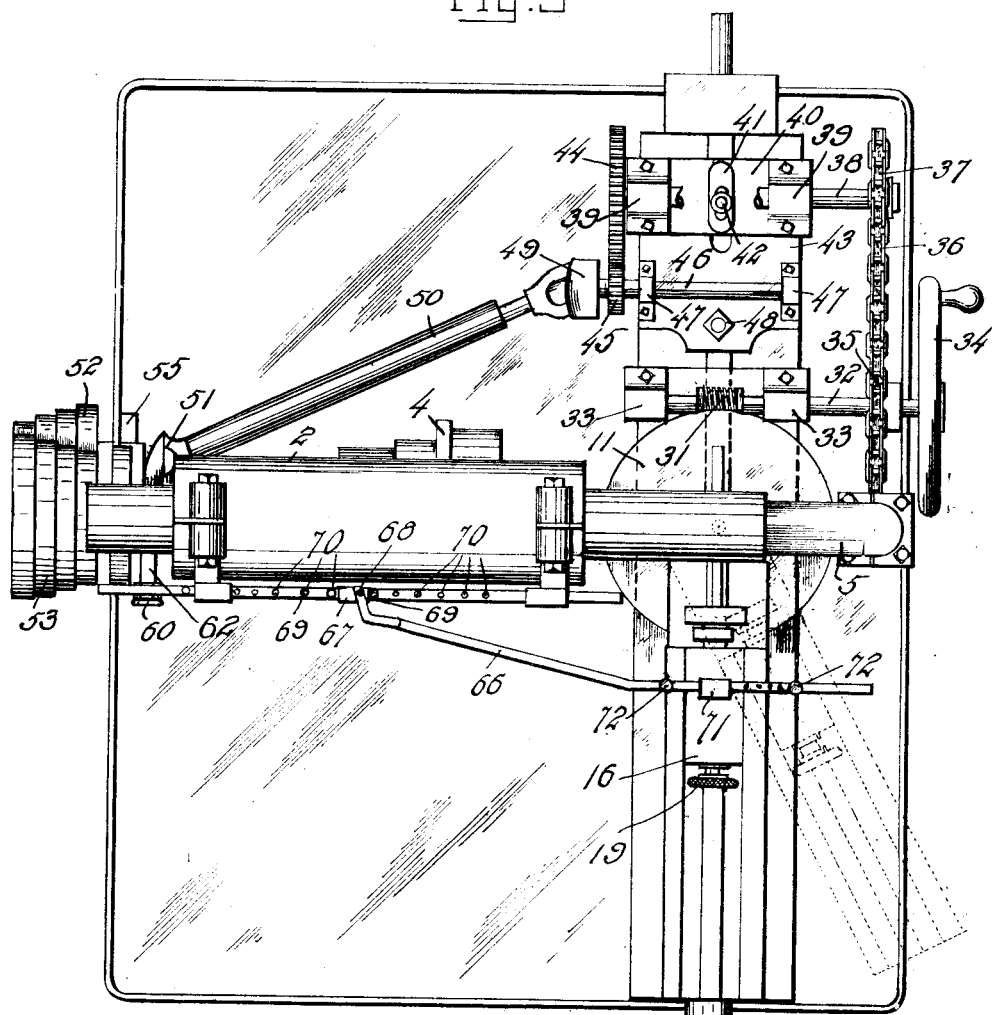

C. F. WALL & F. HARKER.
MACHINE FOR CUTTING TORIC LENS GRINDERS.
APPLICATION FILED AUG. 22, 1907.
1,033,640.
Patented July 23, 1912.
4 SHEETS—SHEET 4.
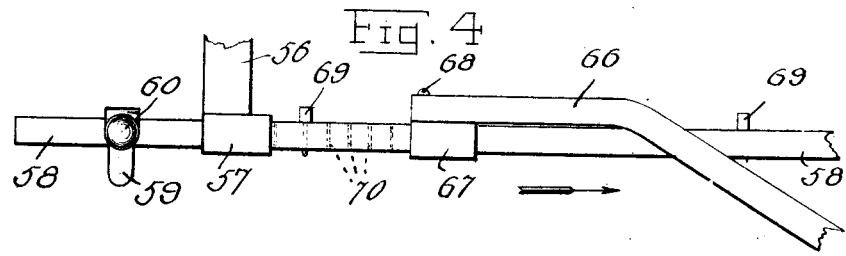
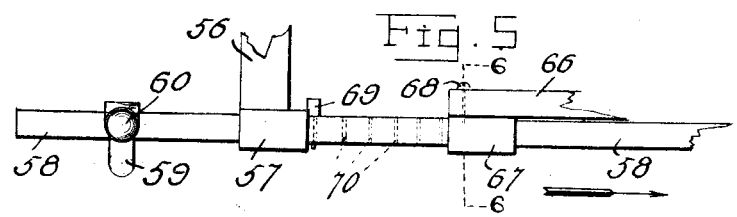
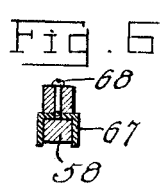 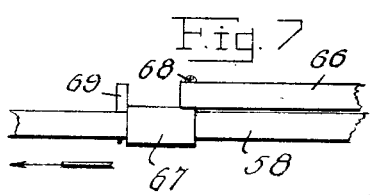 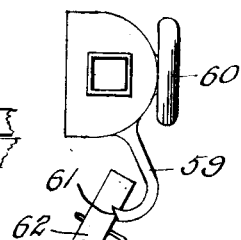
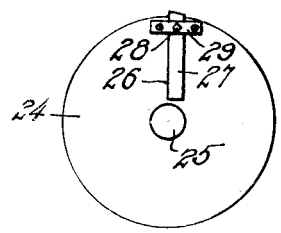 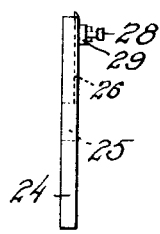 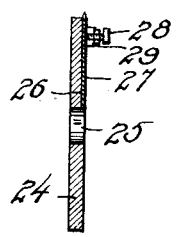
Witnesses:
Frank E Bowers
Victoria V. Bowen
Inventors.
Charles F Wall
Frederick Harker

UNITED STATES PATENT OFFICE.

CHARLES F. WALL AND FREDERICK HARKER, OF PHILADELPHIA, PENNSYLVANIA.

MACHINE FOR CUTTING TORIC-LENS GRINDERS.

1,033,640.  Specification of Letters Patent.  Patented July 23, 1912.

Application filed August 22, 1907. Serial No. 389,731.

*To all whom it may concern:*

Be it known that we, CHARLES F. WALL and FREDERICK HARKER, citizens of the United States, residing at Philadelphia, in the county of Philadelphia and State of Pennsylvania, have invented certain new and useful Improvements in Machines for Cutting Toric-Lens Grinders; and we do hereby declare the following to be a full, clear, and exact description of the invention, such as will enable others skilled in the art to which it appertains to make and use the same.

This invention relates to improvements in machines for cutting Toric lens grinders.

In the optical art, and more particularly in the production of lenses employed in eye-glasses and spectacles, certain conditions require the use of Toric lenses. A lens of this character has curves of different radii, that is, the axes of the lenses are of different radii, and to produce such a lens it is necessary to employ a grinder the working face of which has curves of different radii. In the ordinary production of such tools or grinders, however, much expense is involved by reason of the tedious and laborious methods employed, and these methods are also exceedingly slow because of the extreme care that must be exercised to preserve the proper curvature.

The present invention, therefore, has for its object to provide a machine by the use of which Toric lens grinders may not only be accurately produced, but produced with rapidity as well, without the exercise of any high degree of skill.

The invention also aims to provide a machine of the character mentioned having provision for quick and accurate adjustment of the parts, and also including simple and efficient means by which the same may automatically cut the grinders to the required curvature and by which the feed may be automatically stopped when the limit of the cutting operation has been reached.

With these general objects in view, and others that will appear as the nature of the improvements is better understood, the invention consists substantially in the novel construction, combination and arrangement of parts hereinafter fully described, illustrated in the accompanying drawings, and pointed out in the appended claims.

While the form of the invention herein shown and described is but one adaptation thereof, it is manifest that the invention is susceptible of changes in the form, proportions, and minor details of construction, and the right is accordingly reserved to modify or vary the invention as falls within the spirit and scope thereof.

In the drawings, Figure 1 is a front elevation of a machine embodying the herein-described improvements. Fig. 2 is an end elevation thereof. Fig. 3 is a top plan view of the machine. Figs. 4 and 5 are detail fragmentary views illustrating the shifting bar and the actuating rod therefor in different positions. Fig. 6 is a transverse sectional view on the line 6—6. Fig. 5. Fig. 7 is also a detail fragmentary view of the shifting bar and the actuating rod, the guide of the latter being reversed. Figs. 8, 9, and 10 are detail views of the cutter and its holder. Fig. 11 is a transverse sectional view of the chuck for holding the tool blank. Fig. 12 is a longitudinal sectional view thereof. Fig. 13 is a side elevation of the clutch-lever engaging hook carried by the shifting bar, and illustrated as engaged with the clutch lever. Fig. 14 is a detail elevation of a Toric lens grinder produced by the herein described machine.

Referring in detail to the accompanying drawings, the numeral 1 designates the base of the hereindescribed machine, upon which is mounted a vertical column 2 the upper portion of which provides bearings for a main shaft 3 upon which is mounted a cone pulley 4, and at the upper end of the column 2 an overhanging arm 5 is provided, the free end of the arm providing a bearing for a live spindle 6. The column 2 is also provided with a knee 7 having suitable provision for vertical adjustment, and said knee is provided with a platen 8 upon which a saddle 9 is mounted, said saddle having adjustment longitudinally of the platen 8 through the medium of a feed screw 10.

The parts thus far described are what are commonly found in standard forms of milling machines, and it is therefore unnecessary to describe in further detail such parts.

Pivotally mounted upon the saddle 9, as shown by dotted lines in Fig. 3, is a work table 11, and arranged upon said work table is a tail plate 12 having a longitudinally-extending groove 13 formed therein, and slidably mounted in said groove, and adjustably held therein through the medium of a bolt 14, is a chuck support 15 the chuck 16 of which is slidably mounted therein and held against rotation through the medium of a screw 17 that engages a longitudinally-extending groove 18 formed in said chuck. A feed screw 19 engages the outer end of the chuck 16, and through the medium of said feed screw it will be seen that the chuck 16 may be adjusted within the support 15, the inner end of the chuck, or that end which lies nearest the live spindle 6, receiving the tool blank 20, as shown by dotted lines in Fig. 2. When the tool blank has been properly positioned and the chuck 16 properly adjusted, it is essential that it should be held in this position, and to this end a binding screw 21 operating upon a bearing plug 22, is filled in a screw-threaded head 23 that is secured upon the upper portion of the support 15, the plug 22 fitting an opening in said support, and having its inner end bearing upon the chuck 16.

For shaping the tool blank 20 to impart thereto curves of different radii, the form of the cutter shown in Figs. 8, 9 and 10 is preferably employed. This cutter comprises a holding disk 24 provided with a central opening 25 in order to receive the live spindle 6 of the machine and be held there in the usual manner common to the attachment of milling cutters, and mounted in a radial groove 26 in said disk is a cutting blade 27 that is held in position in said groove through the medium of a binding screw 28 carried by a yoke 29 that bridges the groove 26. It will be observed that the outer end of the blade 27 projects sufficiently beyond the edge of the holding disk 24 for action upon the tool blank 20 during the rotation of said disk, and said blade attacks the tool blank once upon each revolution of the live spindle 6.

For effecting proper feed of the work to the cutter, the work being held stationary in the chuck 16, as before described, the table 11 is caused to swing upon its pivot, and to this end the periphery of said table is provided with worm teeth 30, so that in effect the table 11 constitutes a worm wheel, and meshing with said teeth 30 is a worm gear 31 carried by a counter-shaft 32 journaled in bearings 33, which bearings in turn are mounted upon the saddle 9 in rear of the work table 11. A hand wheel 34 is carried by the shaft 32 at its outer extremity, whereby said shaft may be manually operated when it is desired to effect a quick adjustment of the work table upon its pivot, but in order that a gradual adjustment of the work table upon its pivot may be effected a sprocket wheel 35 is also mounted upon the shaft 32, over which sprocket wheel a sprocket chain 36 is adapted to work, said sprocket chain being also connected to and working over a sprocket pinion 37 mounted upon a counter-shaft 38 arranged beyond the counter-shaft 32 and parallel with the latter. The counter-shaft 38 is journaled in bearings 39 that are carried by a plate 40, and said plate is provided with a transversely extending slot 41 in which a binding bolt 42 is mounted, the purpose of the binding bolt 42 and the slot 41 being to permit adjustment of the plate 40 upon a supporting plate 43 adjustably mounted upon the saddle 9. A spur gear 44 is mounted upon the end of the shaft 38 that is opposite to the pinion 37, said gear 44 meshing with a pinion 45 that is mounted upon a counter-shaft 46, and said shaft 46 is journaled in bearings 47 that are carried by the plate 43. The plate 43 is adjustably held upon the saddle 9 through the medium of a clamping bolt 48, and it will thus be seen that by the adjustability of the plate 43 the shafts 38 and 46 can be moved without disturbing the relation of the gears 44 and 45 for tensioning the sprocket chain 36, or loosening the same. Connected to the shaft 46 through the medium of a universal joint 49 is one end of a telescopic shaft 50, the other end of said shaft being connected through a universal joint 51 with the shaft of a lower cone pulley 52 connected to an upper cone pulley 53 through the medium of a belt 54. Standard reversing mechanism 55 is interposed between the universal joint 51 and the shaft of the lower pulley 52 for effecting a reversal of the movement of the shaft 50, and as the elements 49, 50, 51, 52, 53, 54 and 55 are of the usual construction found in milling machines it is not deemed necessary to further describe the same, nor to illustrate them other than conventionally. Suffice it to say that these elements are relied upon for effecting the operation of the other elements constituting the feed mechanism for moving the work table 11 upon its pivot, and thereby causing movement of the tool blank across the cutter in substantially a horizontal plane, and reversal thereof.

As before premised, the present invention contemplates a machine wherein provision is made for stopping movement of the tool blank in relation to the cutter when the limit of the cutting operation has been reached. To the accomplishment of this end a plurality of depending hanger arms 56 are attached to the upper portion of the column 2, the lower ends of said arms terminating in horizontally disposed sleeves 57, and in said sleeves is slidably mounted a shifting bar 58. It is preferable that the bar 58 shall be square in cross section, and the sleeves 57 therefore conform to such configuration in order to prevent rotation of the shifting bar 58. The shifting bar 58 is of sufficient length for the end thereof that lies in proximity to the cone pulley 53 to project some distance beyond the adjacent sleeve 57, and mounted upon said end is an engaging hook 59 adjustably secured to the bar 58 through the medium of a clamping screw 60. Thus it will be seen that the hook 59 may be adjusted along the shifting bar 58, and said hook is designed to engage a notch 61 formed in the free end of a clutch lever 62. This clutch lever is similar to that commonly found in milling machines for connecting and disconnecting the feed with the main shaft of such machines, and in the present case such clutch mechanism connects and disconnects the upper cone 53 with the main shaft 3 of the machine. When the hook 59 is engaged with the clutch lever 62 the latter is held in elevated position against the tension of a spring 63, that is connected to the clutch lever 62 through the medium of a hook 64, said spring being in turn connected to the body of the machine, or some contiguous part thereof, through the medium of a rod 65. When the clutch lever 62 is held in the elevated position referred to the feed mechanism is connected to the main shaft of the machine, and so long as this connection is maintained the feed of the work across the cutter in the manner previously described, is effected. When, however, the hook 59 is disengaged from the clutch lever 62 the spring 63 exerts its tension to pull the clutch lever 62 in a downward direction, and the feed mechanism is thereby disconnected from the main shaft 3, and the feed of the work immediately ceases. To effect this disengagement of the hook 59 an actuating rod 66 is employed. Connected to one end of said actuating rod is an open guide 67, which guide is of substantial inverted U-shape and is slidably mounted upon the shifting bar 58.

The guide 67 is pivotally connected, as at 68, to the actuating bar 66, the pivotal point being nearer one end of the guide 67 than the other end thereof, and in order that the guide 67 may cause the shifting bar 58 to slide in the sleeves 57, and thereby cause the hook 59 to slide out of the notch 61, a pair of pins 69 is removably seated in a series of openings 70 formed in the bar 58 at spaced intervals, the guide 67, in either direction of its movement along the bar 58, contacting with one or the other of the pins 69, and thereby enabling the guide 67, under the movement of the actuating rod 66, to move the shifting bar 58 for the purpose stated. It is manifest that by adjusting the position of the pins 69 to vary the distances therebetween the guide 67 will have more or less play upon the shifting bar 58 before the latter begins to move under the influence of the movement of the actuating rod 66, and the purpose of this will presently appear.

To effect movement of the actuating rod 66 the end thereof opposite to that whereon the guide 67 is pivoted is slidably mounted in a guide sleeve 71, which guide sleeve in turn is pivotally connected to the upper portion of the chuck support 15, the actuating rod having free movement in said guide sleeve 71, but to limit the movement thereof in relation to the guide sleeve 71 an adjustable stop 72 is mounted at each side of the sleeve 71. Thus it will be seen that the degree of movement of the sleeve between the stops 72 can be varied by adjusting the space between said stops, and consequently the sleeve 71 will have a certain degree of play upon the actuating rod 66, in a manner similar to the play of the guide 67 upon the shifting bar 58, before contacting with either of the stops 72. When, however, such contact takes place the actuating rod 66 begins to move in the direction of movement of the sleeve 71, and this in turn imparts to the guide sleeve 67 a similar movement, so that when the latter comes in contact with one of the pins 69 the shifting bar 58 begins also to move and continues so to do until the engaging hook 59 is released from the clutch lever 62. This disengagement causes the spring 63, as previously described, to pull the clutch lever 62 downwardly, and the feed of the work is thereby stopped. It is evident that the space between the stops 72, and likewise between the pins 69, will be determined by the amount of movement necessary for swinging the face of the tool blank across the cutter, and when the tool blank is moved entirely across the cutter, and the limit of the cutting operation is thereby reached, the feed mechanism will cease to operate and consequently further movement, in either direction of the work table, will cease.

In the operation of the hereindescribed machine a tool blank is inserted in the chuck 16, a depression 20'' in the shank of the tool blank receiving a binding screw 20' carried by the chuck. This engagement of the screw 20' with the tool blank holds the latter in fixed position in the chuck, and also permits removal of the blank for purposes of examination during the grinding operation, and replacing in the chuck without disturbing the relative arrangement of the two curves being cut. In so positioning the tool blank the center thereof must occupy a position in the same horizontal plane as the center of the live spindle 6, so that the crest of each curve to be cut will intersect the crest of the other curve at the center of the tool blank. Having thus adjusted the tool blank, and determined the desired curvature that is to be imparted to the blank in a direction across the face thereof, or in a horizontal plane, measurement is taken from the center or pivot of the work holder 11 through the medium, preferably, of a steel square. When the desired radius is thus measured, the face of the tool blank is moved up to the square so that the latter will contact with the edges of the face of the blank, whereupon the screw 21 is tightened to clamp the chuck 16 in the support 15, and the bolt 14 being also tightened to hold the support 15 in fixed position upon the tail-piece 12, it is evident that the tool blank is in position to receive the required curvature for the long axis of the grinder. For very fine adjustment of the tool blank relatively to the center of the table 11 the feed-screw 19 is employed. The curvature of the short axis of the grinder is easily determined by merely setting the cutting point of the cutter 27 a distance from the center of the live spindle 6 corresponding to the radius previously determined upon, after which the cutter is fastened against movement by the screw 28. Various diameters of the holding disk 24 obviously can be employed. For feeding the tool blank to or from the cutting blade 27 without changing the radius of either the long or short axis the feed screw 10 is operated. The position of the chuck support 15 in relation to the pivot of the work table 11 thereby remains fixed.

With the tool blank positioned as described, the machine is set in operation, power being applied to the cone pulley 4, and with the clutch lever 62 in its raised position, and held therein by the engagement of the hook 59 therewith, it will be seen that movement is transmitted through the pulley 53 and the intermediate connections to the countershaft 32. As the gears 44 and 45 and the sprocket wheels 35 and 37 are properly proportioned, only a slow movement is given to the countershaft 32. This movement through the worm gear 31 to the teeth 30 causes the work table 11 to move slowly about its pivot, thereby swinging the tool blank that is carried by the chuck 16 across the cutter carried by the live spindle 6. When the limit of the cutting operation has been reached, the hook 59 becomes disengaged from the clutch lever 62, and the feed of the work immediately ceases, as previously described. Operation of the reversing mechanism 55 causes a reversal of movement of the feed table 11, and the tool blank returns across the cutter to be again operated on thereby, but in order to permit this reversal it is, of course, necessary to raise the clutch lever 62 so that the feed mechanism may be again connected to and operated from the shaft 3, and to enable the clutch lever 62 to be engaged by the hook 59 and held thereby in its raised position it is first necessary to reverse the position of the guide 67; otherwise, the shifting bar 58 having been moved to its limit in one direction, reverse movement thereof to bring the hook 59 into engagement with the clutch lever 62 cannot be imparted thereto by reason of engagement of the guide 67 with one of the pins 69. This is the purpose of providing the pivotal connection of the guide 67 with the actuating rod 66 at a point near one end of said guide, and by referring to Figs. 4, 5 and 7 the reverse positions of the guide 67, in the two directions of movement, are clearly shown, the arrows indicating the directions of movement. It will be understood that before reversing the feed the tool blank is moved slightly toward the cutter through the manipulation of the feed screw 10, and as the cutting operation proceeds on the return movement of the tool blank a reverse movement of the actuating rod 66 takes place, which, in turn, causes a reverse movement of the shifting bar 58. When the limit of the cutting operation in this reverse direction is reached, the hook 59 is again disengaged from the clutch lever 62, but this time by a reverse lateral movement of said hook and, consequently, the feed mechanism again comes to rest. This operation is repeated to the necessary extent for imparting to the face of the tool blank the required cut to produce the desired curves, and when this has been completed the tool blank is removed, and a new one inserted in the chuck, a like operation being repeated from time to time on the respective blanks until the required curvature has been imparted to each.

From the foregoing it will be seen that the present machine is capable of cutting a Toric lens grinder and simultaneously imparting thereto curves of different radii by the action of a single cutter. After the blank has been placed in the chuck the machine will automatically operate in cutting the blanks, and the only attention that is required is merely to effect a reversal of the feed mechanism when the limit of the cutting operation in each direction of movement of the work has been reached. No high degree of skill is therefore necessary, and a single attendant may readily operate a plurality of machines thereby producing Toric lens grinders in an expeditious manner, and at the same time producing them with the highest degree of accuracy with respect to the curvature thereof.

Having thus described the invention, what is claimed as new, and desired to be secured by Letters Patent, is:

1. In a machine of the class described, a cutting element mounted for movement in an arcuate path, a work support arranged to move the work in an arcuate path across the plane of movement of the cutting element, means for driving the operative elements, a shifting bar operatively related to said driving means, and an actuating rod interposed between said shifting bar and the work support and slidably connected to each for operating the shifting bar to stop the movement of the driving means when the limit of the cutting operation has been reached.

2. In a machine of the class described, a cutting element mounted for movement in an arcuate path, a work support arranged to move the work in an arcuate path across the plane of movement of the cutting element, means for driving the cutting element and said work support, gearing interposed between the driving means for the cutting element and the means for driving the work support, a clutch included in said gearing, a shifting bar having a detachable connection with said clutch, means interposed between said shifting bar and said work support and actuated by the latter to cause the shifting bar to become disengaged from said clutch when the limit of the cutting operation has been reached, and means to actuate said clutch when said disengagement takes place to stop movement of the work support.

3. In a machine of the class described, a cutting element mounted for movement in an arcuate path, a work support arranged to move the work in an arcuate path across the plane of movement of the cutting element, means for driving the cutting element and said work support, gearing interposed between the driving means for the cutting element and the means for driving the work support, a clutch included in said gearing, a shifting bar having a detachable connection with said clutch, an actuating rod interposed between said shifting bar and said work support and actuated by the work support to cause the shifting bar to become disengaged from said clutch when the limit of the cutting operation has been reached, adjustable stops associated with said shifting bar to limit the movement of the actuating rod thereon, and adjustable stops for limiting movement of the work support in relation to said actuating bar.

4. In a machine of the class described, a cutting element mounted for movement in an arcuate path, a work support arranged to move the work in an arcuate path across the plane of movement of the cutting element, means for driving the cutting element and said work support, gearing interposed between the driving means for the cutting element and the means for driving the work support, a clutch included in said gearing, a shifting bar having a detachable connection with said clutch, an actuating rod interposed between said shifting bar and said work support and actuated by the work support to cause the shifting bar to become disengaged from said clutch when the limit of the cutting operation has been reached, adjustable stops associated with said shifting bar to limit the movement of the actuating rod thereon, adjustable stops for limiting movement of the work support in relation to said actuating bar, and means to actuate said clutch when said disengagement takes place to stop the movement of the work support.

5. In a machine of the class described, a cutting element mounted for movement in an arcuate path, a work support arranged to move the work in an arcuate path across the plane of movement of the cutting element, means for driving the cutting element and said work support, gearing interposed between the driving means for the cutting element and the means for driving the work support, a clutch included in said gearing, a shifting bar having a detachable connection with said clutch, adjustable stops carried by said shifting bar, an actuating rod interposed between said shifting bar and said work support and actuated by the work support to cause the shifting bar to become disengaged from said clutch when the limit of the cutting operation has been reached, a guide carried by said actuating rod and slidably mounted upon said shifting bar between the adjustable stops thereof, a pivoted guide carried by said work support and in which said actuating rod is slidably mounted, and adjustable stops mounted upon said actuating rod at the sides of said pivoted guide for limiting movement of said guide upon said actuating rod.

6. In a machine of the class described, a cutting element mounted for movement in an arcuate path, a work holder, a pivoted support upon which said work holder is mounted, a counter-shaft geared to said pivoted support for actuating the latter and thereby to move the work holder in an arcuate path across the plane of movement of the cutting element, a second counter-shaft adjustably mounted in relation to the first-named counter-shaft and geared thereto for actuating the latter, and means for driving the cutting element and the second counter-shaft.

7. In a machine of the class described, a cutting element mounted for movement in an arcuate path, a work holder, a pivoted support upon which said work holder is mounted, a counter-shaft geared to said pivoted support for actuating the latter and thereby to move the work holder in an arcuate path across the plane of movement of the cutting element, means for operating the cutting element, gearing interposed between said counter-shaft and the means for operating the cutting element, a clutch included in said gearing, and means controlled by the movement of the work holder for actuating said clutch to disconnect said gearing from the cutter-operating means when the limit of the cutting operation has been reached.

8. In a machine of the class described, a cutting element mounted for movement in an arcuate path, a work holder, a pivoted support upon which said work holder is mounted, gear teeth carried by said pivoted support, a counter-shaft journaled in proximity to said pivoted support, a worm gear carried by said counter-shaft and meshing with the teeth of said pivoted support, whereby to actuate the latter and thereby to move the work holder in an arcuate path across the plane of movement of the cutting element, means for operating the cutting element, a second counter-shaft adjustably mounted in relation to the first-named counter-shaft, gearing interposed between said second counter-shaft and the first-named counter-shaft, gearing interposed between the second counter-shaft and the means for operating the cutting element, a clutch included in said gearing and adapted to disconnect the latter from the means for operating the cutting element, and means interposed between said clutch and the work holder and controlled by the movement of the latter for effecting operation of said clutch when the limit of the cutting operation has been reached.

In testimony whereof we affix our signatures, in the presence of two witnesses.

CHARLES F. WALL.
FREDERICK HARKER.

Witnesses:
J. HARRY BOWERS,
WM. S. BOWEN, JR.